US012762839B2

(12) United States Patent
Fan et al.

(10) Patent No.: US 12,762,839 B2
(45) Date of Patent: Oct. 13, 2026

(54) METHOD, APPARATUS AND COMPUTER-READABLE STORAGE MEDIUM FOR PREDICTING TARGET OBJECT

(71) Applicant: Beijing Tusen Zhitu Technology Co., LTD., Beijing (CN)

(72) Inventors: Lue Fan, Beijing (CN); Feng Wang, Beijing (CN); Naiyan Wang, Beijing (CN)

( * ) Notice: Subject to any disclaimer, the term of this patent is extended or adjusted under 35 U.S.C. 154(b) by 218 days.

(21) Appl. No.: 18/779,028

(22) Filed: Jul. 21, 2024

(65) Prior Publication Data

US 2025/0037427 A1 Jan. 30, 2025

(30) Foreign Application Priority Data

Jul. 25, 2023 (CN) ......................... 202310917325.5

(51) Int. Cl.
*G06V 10/764* (2022.01)
*G06T 17/20* (2006.01)
*G06V 10/20* (2022.01)

(52) U.S. Cl.
CPC ............ *G06V 10/764* (2022.01); *G06T 17/20* (2013.01); *G06V 10/255* (2022.01); *G06V 2201/07* (2022.01)

(58) Field of Classification Search
CPC ...... G06F 18/213; G06N 3/0464; G06N 3/08; G06V 10/82; G06V 2201/07; G06V 10/764; G06V 10/255; G06T 2210/12; G06T 19/00; G06T 17/20; G01S 7/4802; G01S 17/931
See application file for complete search history.

(56) References Cited

PUBLICATIONS

L. Fan, Y. Yang, F. Wang, N. Wang and Z. Zhang, "Super Sparse 3D Object Detection," in IEEE Transactions on Pattern Analysis and Machine Intelligence, vol. 45, No. 10, pp. 12490-12505, Jan. 2023, doi: 10.1109/TPAMI.2023.3286409.) (Year: 2023).*
J. Ning, F. Da and S. Gai, "Density Aware 3D Object Single Stage Detector," in IEEE Sensors Journal, vol. 21, No. 20, pp. 23108-23117, 15 Oct. 15, 2021, doi: 10.1109/JSEN.2021.3106302 (Year: 2021).*

* cited by examiner

*Primary Examiner* — Matthew C Bella
*Assistant Examiner* — Janice E. Vaz

(57) ABSTRACT

The present disclosure provides a method for predicting a target object, including performing a first voxelization on a plurality of first points included in a point cloud to obtain a plurality of first voxels; predicting a plurality of second points from the plurality of first voxels, wherein each of the plurality of second points represents a prediction of a center of the target object by a first point; performing a second voxelization on a plurality of first points and a plurality of second points to obtain one or more second voxels and one or more third voxels; and predicting the target object from the one or more third voxels. In addition, the present disclosure also provides an apparatus and non-transitory computer-readable storage medium that can perform the methods described above.

20 Claims, 8 Drawing Sheets

METHOD, APPARATUS AND COMPUTER-READABLE STORAGE MEDIUM FOR PREDICTING TARGET OBJECT

The present disclosure claims priority to Chinese Patent Application No. 202310917325.5, titled "Method, apparatus and computer-readable storage medium for predicting target object", filed on Jul. 25, 2023, the content of which is incorporated herein by reference in its entirety.

TECHNICAL FIELD

The present disclosure relates to the field of image processing, in particular, to a method, apparatus and non-transitory computer-readable storage medium for predicting a target object.

BACKGROUND

At present, lidar is a scanning sensor using non-contact laser ranging technology, its working principle is similar to that of a general radar system. By emitting laser beams to detect the target, and by collecting the reflected beams to form point clouds (point cloud data), the perception of a spatial range of the target object can be achieved after a certain processing on these point clouds, which has been widely used in the field of intelligent driving.

In the prior art, point clouds are mainly converted into compact voxels (voxel data), and then voxel features of the compact voxels are extracted and calculated on a compact voxel feature map. This method consumes a lot of computational cost for a large spatial range of data, which is not conducive to fast perception of long-distance target objects. There are prior art improvements to the above method, i.e., only sparse point clouds are processed, e.g., point clouds are converted to fully sparse voxels to predict the target object. Therein, it would be necessary to perform instance segmentation on an object, i.e., performing clustering on a point cloud, then extracting object features and predicting a bounding box thereof. However, this computational approach is very complex. At the same time, the accuracy of object instance segmentation will also greatly affect the accuracy of the final prediction of the target object.

SUMMARY

In view of the above, the present disclosure provides a method, apparatus, and computer-readable storage medium for predicting a target object by performing a second voxelization processing on a plurality of point data features to obtain real voxels and virtual voxels. This is because there are many important features of the target object itself in and around the prediction center point to which the target object belongs, so the accuracy of prediction can be improved. Therefore, the method proposed in the present disclosure can not only simplify the complicated instance segmentation step, but also increase the accuracy of target object prediction.

A first aspect proposes a method for predicting a target object, including performing a first voxelization on a plurality of first points included in a point cloud to obtain a plurality of first voxels; predicting a plurality of second points from the plurality of first voxels, wherein each of the plurality of second points represents a prediction of a center of the target object by a first point; performing a second voxelization on a plurality of first points and a plurality of second points to obtain one or more second voxels and one or more third voxels; and predicting the target object from the one or more third voxels, wherein the one or more second voxels correspond to the plurality of first points and the one or more third voxels correspond to the plurality of second points.

A second aspect of the present disclosure proposes a system for predicting a target object, including a memory storing a computer program; and a processor coupled to the memory, wherein the processor, when executing the computer program, causes the prediction system to perform a first voxelization on a plurality of first points included in a point cloud to obtain a plurality of first voxels; predict a plurality of second points from the plurality of first voxels, wherein each of the plurality of second points represents a prediction of a center of the target object by a first point; performing a second voxelization on a plurality of first points and a plurality of second points to obtain one or more second voxels and one or more third voxels; and predicting the target object from the one or more third voxels, wherein the one or more second voxels correspond to the plurality of first points and the one or more third voxels correspond to a method for the plurality of second points.

A third aspect of the present disclosure proposes a computer-readable storage medium storing a computer program which, when executed by a processor, implements a method including performing a first voxelization on a plurality of first points included in a point cloud to obtain a plurality of first voxels; predicting a plurality of second points from the plurality of first voxels, wherein each of the plurality of second points represents a prediction of a center of the target object by a first point; performing a second voxelization on a plurality of first points and a plurality of second points to obtain one or more second voxels and one or more third voxels; and predicting the target object from the one or more third voxels, wherein the one or more second voxels correspond to the plurality of first points and the one or more third voxels correspond to the plurality of second points.

BRIEF DESCRIPTION OF THE DRAWINGS

The accompanying drawings, which are incorporated in and constitute a part of this description, illustrate embodiments and, together with the description, serve to explain exemplary implementations of the embodiments. It is obvious that the figures in the following description are only some embodiments of the present invention, and it would have been obvious for a person skilled in the art to obtain other figures according to these figures without involving any inventive effort. Throughout the drawings, the same reference numerals indicate similar but not necessarily identical elements.

DETAILED DESCRIPTION

In order to make the objects, technical solutions and advantages of the present invention more apparent, the present invention will be described in further detail below with reference to the attached drawings, and it is to be understood that the described embodiments are only a few embodiments of the present invention, rather than all embodiments. Based on the embodiments of the present invention, all other embodiments obtained by a person skill in the art without inventive effort fall within the scope of the present invention.

In the present disclosure, the term "a plurality of" means two or more, unless otherwise specified. In the present disclosure, the term "and/or" describes an associated relationship of associated objects and encompasses any and all possible combinations of the listed objects. The character "/" generally indicates that the associated object is an OR relationship.

In the present disclosure, unless otherwise noted, the use of the terms "first", "second", and the like are used to distinguish between similar objects and are not intended to limit their positional, temporal, or importance relationships. It is to be understood that the terms so used are interchangeable under appropriate circumstances such that the embodiments of the present invention described herein are capable of operation in other ways than those illustrated or otherwise described herein.

Moreover, the terms "include" and "have", as well as any variations thereof, are intended to cover a non-exclusive inclusion, such that a process, method, system, product, or device that includes a list of steps or elements is not necessarily limited to those steps or elements expressly listed, but may include other steps or elements not expressly listed or inherent to such process, method, system, product, or apparatus.

Figure 1:
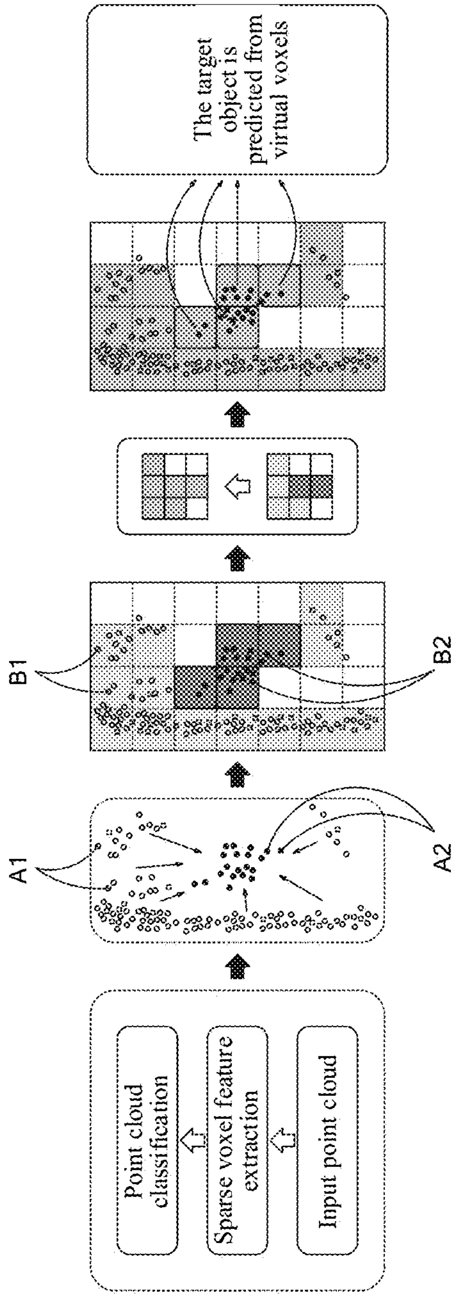
FIG. 1 is a schematic diagram illustrating a flow of a prediction method for a target object according to an embodiment of the present disclosure.

FIG. 1 is a schematic diagram illustrating a flow of a prediction method for a target object according to an embodiment of the present disclosure.

An application scenario example of a prediction system for a target object is provided in the present disclosure. During travel of the vehicle, the on-board lidar mounted on the vehicle may acquire a point cloud (point cloud data) of the surroundings of the vehicle at certain time intervals. Of course, the point cloud of the surroundings of the vehicle may be acquired at regular intervals while the vehicle is traveling. After the point cloud is acquired by the on-board lidar, the on-board lidar may transmit the point cloud to the server through the network. After acquiring the point cloud, the server may divide the point cloud into $l_x \times l_y \times l_z$ a plurality of squares according to the spatial extent. Therein, each pane may be one voxel after the first voxelization processing. Referring then to FIG. 1 from the step of inputting the point cloud to the step of sparse voxel feature extraction, a deep learning model, such as a PointNet point cloud feature extractor, may be used for one or more voxels to extract point cloud features based on the point cloud, obtaining a plurality of first voxels with features.

Referring to FIG. 1, after obtaining a plurality of first voxels, the first voxels may be input to a sparse voxel encoder, such as a sparse convolution network or a sparse attention network, to obtain first voxel features. After obtaining the first voxel feature, the first voxel feature may be mapped onto one or more first points A1 included by the first voxel corresponding to the first voxel feature, one or more initial point data features may be obtained, and one or more point data features may be formed by combining one or more geometric features between the first points A1 and the center of the first voxel to which the first points A1 belong.

Reference may be made to FIG. 1 from the step of sparse voxel feature extraction to the step of point cloud classification and the step of center prediction. After acquiring the one or more point data features, the server may input the one or more point data features into a Multilayer Perceptron (MLP) to predict a plurality of offsets between the plurality of first points A1 and the center of the target object, obtaining a plurality of second points A2.

With continued reference to FIG. 1, a second voxelization is performed on a plurality of first points A1 and a plurality of second points A2 to obtain one or more second voxels B1 and one or more third voxels B2. In some embodiments, the second voxel corresponds to a first point A1 which is real in the point cloud and may be referred to as a real voxel, while the third voxel corresponds to a second point A2 generated by prediction and may be referred to as a virtual voxel. The one or more second voxels correspond to a plurality of first points and the one or more third voxels correspond to a plurality of second points. Next, after obtaining a plurality of third voxels, the third voxels may be input to a sparse voxel encoder, such as a sparse convolution network or a sparse attention network, to obtain a plurality of third voxel features. Next, a plurality of third voxel features may be mixed by a first mixing module to obtain a plurality of first mixed voxel features. In particular, each of the plurality of third voxels corresponds to one of the plurality of first mixture voxel features.

In some embodiments, the plurality of second voxels and the plurality of third voxels may be input to a sparse voxel encoder, such as a sparse convolution network or a sparse attention network, to obtain a plurality of second voxel features and a plurality of third voxel features. Next, the plurality of second voxel features and the plurality of third voxel features are mixed to obtain a plurality of second mixed voxel features. In particular, each of the second voxels corresponds to one of the plurality of second mixed voxel features and each of the third voxels corresponds to one of the plurality of second mixed voxel features.

Next, a prediction module of a neural network (not shown in the drawing) is provided, and the target prediction markers corresponding to the third voxels are generated by the prediction module of the neural network based on the second mixture voxel features corresponding to the plurality of third voxels. In some embodiments, a target prediction marker corresponding to a third voxel may also be generated by a prediction module of a neural network based on a first mixture voxel feature corresponding to one of the third voxels. Here, the target prediction marker may be a prediction box used to predict the target object. The target object can thus be predicted using the target prediction marker output by the prediction model of the neural network.

Here, since the target prediction markers overlap to an extent, the best target prediction marker can be selected from the overlapped target prediction boxes by Non-Maximum Suppression (NMS). The result of the target object prediction of the previous step is modified.

It is noted that the mixing module for mixing the plurality of second voxel features and the plurality of third voxel features may be the first mixing module described above, or alternatively a second mixing. Moreover, the mixing module for mixing the plurality of second voxel features and the plurality of third voxel features may be a mixing module including a convolution network model. The first mixed voxel features mixed by the first mixing module and the second mixed voxel features mixed by the first mixing module or the second mixing module can both be used to extract the features of the prediction target more effectively, to obtain a target prediction marker for predicting the target object, i.e., a prediction box for the target object, thereby improving the accuracy of the prediction for the target object. Finally, the server can send the prediction box used to predict the target object to the control system of the vehicle in the process of intelligent driving, so that the vehicle can timely determine whether it is necessary to take braking measures, whistling and other means.

Figure 2:
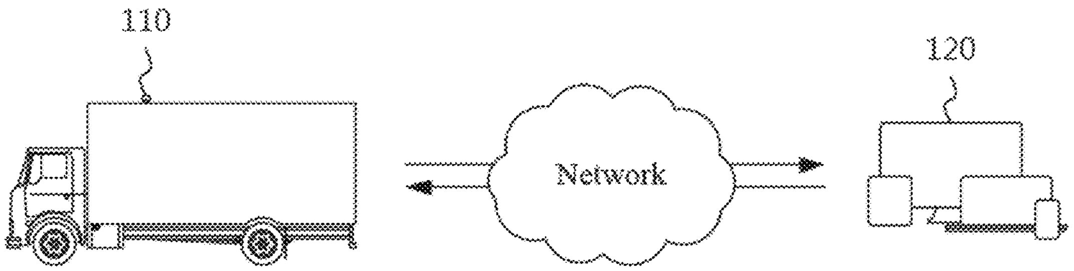
FIG. 2 is a flow chart illustrating a prediction system of a target object according to an embodiment of the present disclosure.

Referring to FIG. 2, implementations of the present disclosure provide a prediction system for a target object. The system for predicting a target object may include a data acquisition device 110 and a server 120. The data acquisition device 110 may be a lidar with network access capability installed on a vehicle that may be intelligently driven. Specifically, for example, the data acquisition device 110 may be a scanning device, such as a lidar, that scans the point cloud. The lidar may be a vehicle-mounted lidar, an airborne lidar, a satellite-mounted lidar, a rack-and-station lidar, a mobile lidar, etc. The server 120 may be an electronic device having certain arithmetic processing capabilities. It may have a network communication module, processor and memory, etc. Of course, the server may also refer to a software running on the electronic device. The server 120 may also be a distributed server, and may be a co-operating system having multiple processors, memory, network communication modules, etc. Alternatively, the server 120 may be a server cluster of several servers. Alternatively, with the development of science and technology, the server 120 can also be a new technical means capable of realizing the corresponding functions of the implementations of the description. For example, it may be a "server" based on a new form of quantum computing implementation.

Figure 3:
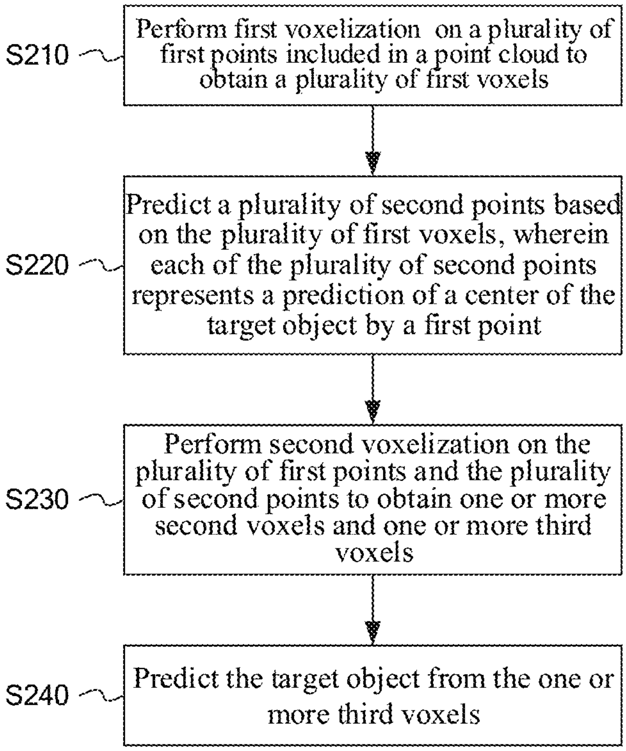
FIG. 3 is a schematic diagram illustrating a flow of a prediction method for a target object according to an embodiment of the present disclosure.

Referring to FIG. 3, an embodiment of the present disclosure provides a prediction method of a target object. The prediction method for the target object may be applied to a server. The prediction method for the target object may include the following steps.

Step S210: the first voxelization is performed on a plurality of first points included in a point cloud to obtain a plurality of first voxels.

In some embodiments, when identifying a target object using a point cloud, the point cloud needs to be converted into grid data of a certain size. Thus, a point cloud can first be converted into volume data that can represent a range of objects.

The point cloud may be a set of vectors in a three-dimensional coordinate system. The method for acquiring a point cloud can be scanning a lidar, and scanning data obtained by scanning is recorded in the form of points, and each point contains three-dimensional coordinates. Of course, the point cloud may also include information representing properties of the scanned object such as color, reflectivity, intensity, etc. Of course, the point cloud may also be a set of vectors in a two-dimensional coordinate system.

In some implementations, the step of performing the first voxelization on the point cloud to obtain a plurality of first voxels may include: dividing the point cloud into the plurality of first voxels at a specified resolution according to a spatial coordinate range of the point cloud.

The method for the first voxelization can divide a point cloud into a grid according to a spatial range, so that the point cloud can be stored in a memory orderly, which is beneficial to reducing random memory access and increasing data operation efficiency. By performing the first voxelization on a plurality of first points included in a point cloud to obtain a plurality of first voxels, a spatial convolution operation can be efficiently performed on the first voxels, which is beneficial to extract multi-scale and multi-level local features. On the other hand, after the first voxelization processing, the point cloud can be effectively down-sampled, which is suitable for processing point clouds with larger orders of magnitude.

The first voxel may be a pixel of a 3-dimensional space. In particular, the size of the voxels may be set in advance, such as a square of 5 cm*5 cm*5 cm, a square of 30 cm*30 cm*30 cm, a cube of any side length between 5 cm and 30 cm, or a cube of other sizes. That is, each of the first voxels can include a plurality of first points in a point cloud.

In some embodiments, a class of a plurality of first points may also be predicted based on a classifier (e.g., Multilayer Perceptron, MLP) and a plurality of point data features. That is, the category of the target object to which the first point belongs, or the background category. In some cases, the first point is point cloud data representing the target object. Specifically, for example, the point cloud scanned by the onboard lidar includes buildings, trees, ground, pedestrians, obstacles, etc. and since the vehicle may be affected by obstacles, pedestrians, etc. during running, it is necessary to whistle or avoid them. Of course, in some cases, the first point may also be point cloud data representing ground data to identify a lane line to alert the vehicle that an immediate lane change is required during driving.

The method for performing the first voxelization on the point cloud may include: according to the minimum value and maximum value of all the points in the point cloud in three coordinate directions of X, Y and Z, determining the minimum cuboid containing all the points; setting the size of the first voxel according to the size of the minimum cuboid and the resolution requirement, and dividing the minimum cuboid into first voxels according to the size of the first voxel; for each point in the point cloud, determining a first voxel where it is located; after traversing all points of the point cloud, only displaying the first voxel containing points.

Step S220: a plurality of second points are predicted from the plurality of first voxels, wherein each of the plurality of second points represents a prediction of a center of the target object based on a first point.

In some embodiments, step S220 includes extracting a plurality of first voxel features of a plurality of first voxels; obtaining a plurality of point data features of a plurality of first points based on a plurality of first voxel features; and predicting a plurality of second points based on the plurality of point data features.

In some embodiments, a plurality of first voxel features of a plurality of first voxels may be extracted by a sparse voxel encoder (e.g., a sparse convolution-based network, a sparse attention network, etc.). In some cases, if feature extraction is performed directly on points in the point cloud, the features of the extracted point data may be relatively poor, thus directly affecting the classification of the point cloud or the result of point cloud segmentation. Since the feature of the point data included in the first voxel is similar to the first voxel feature, for each of the plurality of first voxels: after obtaining a plurality of first voxels using the first voxelization, a first voxel feature of the first voxel may be mapped onto one or more first points included by the first voxel to obtain one or more initial point data features. Next, one or more geometric features between the one or more first points and the corresponding first voxels are computed. Next, one or more point data features for one or more first points of the first voxel are generated based on one or more initial point data features and one or more geometric features (e.g., an offset of each first point from a center of the first voxel).

The first voxel feature may be extracted using a point cloud feature extractor. Specifically, for example, pointNet may be used to extract initial point cloud features. PointNet is a neural network architecture that can process point clouds end-to-end. PointNet has two alignment networks, i.e., T-Net that respectively align input data (input transform) and features (feature transform), which can be denoted as T-Net-1 and T-Net-2. The T-Net-1 output is a 3×3 transformation matrix for transforming the xyz. The T-Net-2 output is a 64×64 matrix that is used to align the feature space so that the transformation matrix A of the feature space is as close to an orthogonal matrix as possible. Of course, the method for extracting the first voxel feature is not limited in the embodiments of the present disclosure, and the method for extracting the initial voxel feature may also be PointNet$^{++}$, KPConv, pointConv, Point Transformer, etc.

In some cases, in order to enrich the extracted features. Thus, the first voxel feature may be extracted using a sparse voxel encoder.

The method for inputting a first voxel into a pre-set sparse voxel encoder to extract a first voxel feature can be carried out by using a commonly used sparse voxel encoder. In particular, the first voxel may be represented in the form of a sparse matrix, which is then input to a 3D convolution network, e.g., a sparse convolution-based network, for feature extraction.

In some cases, since each of the plurality of first voxels may include a plurality of first points, if the first voxel features are directly mapped to the first points included in the first voxel, the resulting point data features of the first points may be duplicated. Therefore, in order to distinguish the points included in each first voxel, the point data feature of the first point can also be obtained by adding the geometric dimension or the geometric feature of the point (point data), so that the obtained point data feature can be distinguished. The geometric feature may be a relation feature between the first point and a first voxel to which the first point belongs. Specifically, for example, the distance relationship between the first point and the first voxel may be derived from the difference between the coordinate vector of the first point and the coordinate vector of the center of the first voxel to which the first point belongs. Of course, the geometric feature may include an angle between a straight line connecting the first point and the center of the first voxel and a horizontal direction, a vertical direction, or some specified direction.

In some cases, the point data feature of the first point may be obtained by directly mapping the first voxel feature to the first point.

The first point may be point data in an initial point cloud. The first point may be a further division of smaller voxels based on the currently divided first voxel. Since a smaller voxel represents a smaller spatial extent, this smaller voxel can be treated as a point, with little difference between the center vector (centroid) of the smaller voxel and the vector of point data included in the voxel.

The initial point data feature is an initial point data feature obtained by mapping a first voxel feature onto a first point included by a first voxel corresponding to the first voxel feature. Specifically, for example, if four first points are included within a first voxel, the four first points have the same initial point data features. Of course, in order to distinguish the four first points, the four point data features of the four first points can also be generated by adding the relative coordinates of the four first points with respect to the center of the first voxel of the first voxel to which the four first points belong to an initial point data feature.

Of course, the one or more point data features of the one or more first points may also be obtained by a certain interpolation algorithm, such as an inverse distance weighted interpolation algorithm, a linear interpolation method, a bilinear interpolation method, a Kriging interpolation method, etc. Specifically, for example, the step of taking the point data feature using Inverse Distance Weighted (IDW) interpolation method may comprise: determining a reference pixel (i.e., a first voxel) to be used at the point, calculating a distance between the first point vector and a center vector of the first voxel, and then using the Formula:

$$\hat{Z}(S_0) = \sum_{i=1}^{N} \lambda_i Z(S_i) \quad \text{(Formula 1)}$$

wherein $\hat{Z}(S_0)$ is a feature of data of a point to be interpolated, $Z(S_i)$ is an attribute value of a reference pixel, N is the number of selected reference pixels, and $\lambda_i$ is a weight coefficient calculated according to the reciprocal of a distance.

In some embodiments, a plurality of offsets between a plurality of first points and a center of the target object are predicted based on a classifier (e.g., Multilayer Perceptron, MLP) and a plurality of point data features, and a plurality of second points are obtained based on the plurality of first points and the plurality of offsets.

Offset means the position difference of the first point with respect to the center of the target object. By means of a plurality of first points and a plurality of offsets, a plurality of center positions can be predicted which correspond to the desired predicted target object, i.e., a plurality of second points.

Step S230: the second voxelization is performed on the plurality of first points and the plurality of second points to obtain one or more second voxels and one or more third voxels.

In the present embodiment, a first voxel feature may be mapped onto a first point to obtain an initial point data feature, then a plurality of offsets between the plurality of first points and the center of the target object are calculated, and based on the plurality of first points and the plurality of offsets, then a plurality of second points are obtained. Then, the second voxelization is performed on a plurality of first points to obtain one or more second voxels; at the same time, the above-mentioned second voxelization is performed on a plurality of second points to obtain one or more third voxels. Since the second voxel is obtained by voxelizing the first point (the point in the original point cloud), it can also be called a real voxel. Since the third voxel is obtained by voxelizing the second point (the point generated through prediction), it can also be referred to as a virtual voxel. In some embodiments, a size of a second voxel or a third voxel obtained by the second voxelization is larger than a size of a first voxel obtained by the first voxelization. For example, the size of the second voxel or the third voxel may be a cube of 0.5 m*0.5 m*0.5 m, or a cube of another size. The third voxel is mostly located near the center of the target object, so the problem of missing the center feature in the sparse point cloud can be solved by obtaining the third voxel. Also, since the third voxel is close to the center of the target object, the difficulty of position prediction by the network is reduced. That is, the prediction method for the target object in the present embodiment contributes to the improvement of the overall operation performance, as compared with a method for segmenting an object in a conventional method, such as a method for clustering a point cloud.

In particular, the first voxels may be defined such that the number of first points included in each first voxel is greater than or equal to a first predetermined value, wherein the first predetermined value is, for example, 1. That is, a voxel is defined as a first voxel when the number of first points in the voxel is greater than or equal to 1. A third voxel is defined in that the number of second points in each third voxel is greater than or equal to a second predetermined value, wherein the second predetermined value is, for example, 1. That is, when the number of second points in a voxel is greater than or equal to 1, this voxel is defined as the third voxel However, the first predetermined value and the second predetermined value may be set to other values according to actual requirements.

Step S240: a target object is predicted based on the one or more third voxels.

In some embodiments, one or more third voxel features of the one or more third voxels may be extracted to predict the target object. Alternatively, the target object may be predicted based on the one or more second voxels and the one or more third voxels. In particular, the plurality of third voxel features of the plurality of third voxels and the plurality of second voxel features of the plurality of second voxels may be extracted by a sparse voxel encoder (e.g., a sparse convolution-based network, a sparse attention network, etc.).

In some embodiments, after extracting the plurality of third voxel features of the plurality of third voxels, the plurality of third voxel features may be used directly to predict the target object without passing through a mixing module to get mixed.

In some cases, each of the plurality of third voxel features may not completely cover the entire target object. For example, one of the plurality of third voxel features may include only a hood of a vehicle, rather than the entire vehicle. That is because in reality the center prediction of the target object is not completely accurate, that is to say, the centric prediction of the target object may not be located at the center position of the target object. Therefore, a mixing module is needed to mix one or more third voxel features nearby. This mixing module may mix multiple voxels using a sparse feature extraction encoder (e.g., a sparse convolution-based network, a sparse attention network, etc.).

Figure 4A:
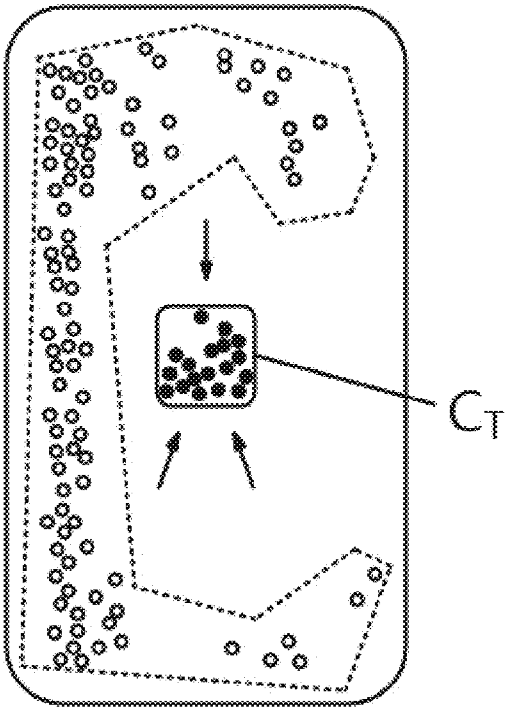
FIG. 4A is a schematic diagram illustrating a virtual feature mixing module according to an embodiment of the present disclosure.
Figure 4B:
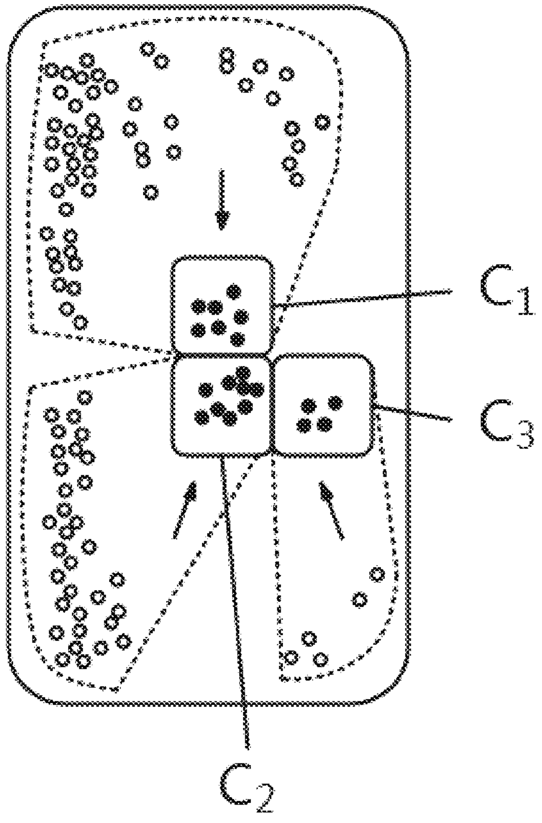
FIG. 4B is a schematic diagram illustrating a virtual feature mixing module according to an embodiment of the present disclosure.

Referring to FIGS. 4A and 4B, a schematic diagram of a mixing module is shown in an embodiment of the present disclosure.

FIGS. 4A and 4B both predict the same target object. In FIG. 4A, the center prediction (point within the block) for the target object is more accurate, and the features of the entire target object are aggregated into a voxel $C_T$, which is a virtual voxel. With continued reference to FIG. 4B, in one embodiment, it is assumed that the center prediction of the target object is divided into three center predictions (voxel $C_1$, voxel $C_2$, and voxel $C_3$, respectively), that is, the features of the target object are split into the features provided by voxel $C_1$, voxel $C_2$, and voxel $C_3$. For example: when the feature provided by voxel $C_1$ is only a roof of the vehicle, the prediction of the target object is made directly from the voxel feature represented by voxel $C_1$. At this time, this is equivalent to predicting a vehicle only with the characteristics of the roof. The voxel $C_1$, voxel $C_2$ and voxel $C_3$ are virtual voxels. Thus, in some embodiments, voxel $C_1$, voxel $C_2$, and voxel $C_3$ may be subjected to feature extraction by a sparse feature extraction encoder to mix a plurality of virtual voxel features and to perform target object prediction by mixing the plurality of virtual voxel features. This can make full use of the features of the whole target object for prediction, and can accurately predict the target object without using instance segmentation (equivalent to segmenting an object, i.e., performing a clustering on a point cloud). The above method is simpler than the instance segmentation, and helps to improve the overall operation performance. By mixing multiple virtual voxel features, the target object can be predicted more accurately.

In some embodiments, the plurality of third voxel features of the plurality of third voxels may be extracted by a sparse voxel encoder (e.g., a sparse convolution-based network, a sparse attention network, etc.). Next, a plurality of third voxel features are mixed by one or more mixing modules to obtain a plurality of first mixed voxel features. Each of the plurality of third voxels corresponds to one of the plurality of first mixture voxel features.

In some embodiments, the plurality of second voxel features of the plurality of second voxels may be extracted by a sparse voxel encoder (e.g., a sparse convolution-based network, a sparse attention network, etc.). A plurality of second voxel features are then mixed by one or more mixing modules, obtaining a plurality of first mixed voxel features. Each of the plurality of second voxels corresponds to one of the plurality of first mixed voxel features.

In some embodiments, a plurality of second voxel features of the plurality of second voxels and a plurality of third voxel features of the plurality of third voxels may be extracted by a sparse voxel encoder (e.g., a sparse convolution-based network, a sparse attention network, etc.). Next, a plurality of second voxel features and a plurality of third voxel features are simultaneously mixed by one or more mixing modules to obtain a plurality of second mixed voxel features. Each of the one or more second voxels corresponds to one of a plurality of second mixture voxel features, and each of the one or more third voxels corresponds to one of a plurality of second mixture voxel features. That is, every second voxel as well as every third voxel has a corresponding mixed second voxel feature.

The modules of mixing voxel features in the above-described embodiments may be realized by one or more mixing modules of a convolution network model respectively, or may be realized by the same one or more mixing modules. The input to the mixing module may be a second voxel feature, a third voxel feature or a mixture of both voxel features.

Prediction of a target object comprises, in addition to obtaining mixed voxel features, generating through a prediction module according to the mixed voxel features corresponding to each voxel target prediction markers corresponding to the voxels. A voxel may correspond to a target prediction marker.

In some embodiments, the target object may be predicted based on the plurality of first mixed voxel features. Alternatively, the target object may be predicted based on the plurality of second mixed voxel features. In particular, the target object may be predicted based on second mixture voxel features corresponding to one or more third voxels to generate target prediction markers corresponding to the third voxels. In more detail, a target prediction marker corresponding to a third voxel may be generated by a prediction module based on a second mixture voxel feature corresponding to one third voxel. The target prediction marker is a prediction of a target object. Further, the target prediction marker is a prediction box (bounding box) for the target object.

In some embodiments, one or more third voxels may be input to the neural network to output target prediction markers through a prediction model of the neural network. Then, the target object is predicted using the target prediction markers output by the prediction model of the neural network.

Figure 5:
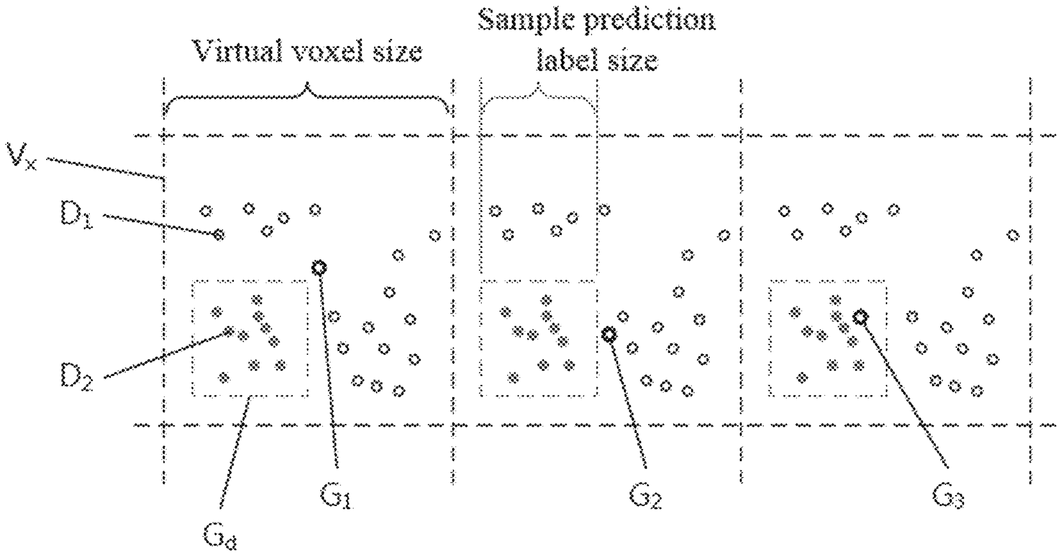
FIG. 5 is a schematic diagram illustrating a method for training a target object according to an embodiment of the present disclosure.

In some embodiments, referring to FIG. 5, for each of the one or more third voxels, a centroid position representing the corresponding one or more second points of the third voxel may be calculated. The one or more second points corresponding to the third voxels include one or more foreground points $D_2$ and one or more non-foreground points $D_1$. A foreground point $D_2$ is, for example, a point belonging to points representing a target object in a point cloud, and the non-foreground point $D_1$ is, for example, a point not belonging to the points representing the target object in the point cloud.

Referring to FIG. 5, to save computation, the size of the third voxel may be larger than some smaller objects. For example, the light emitting area of the traffic light is not large in size as seen from a distance, so that the size of the third voxel may be larger than the light emitting area of the traffic light. However, this makes it difficult to determine whether a voxel contains a smaller object block, and thus difficult to determine whether to assign the smaller object block to a point within the voxel for training when training the neural network. Therefore, there is a need to provide a method for training a prediction model of a neural network to avoid the above problems as much as possible.

In some embodiments, to train a prediction model of a neural network, the prediction method of a target object further includes obtaining a sample prediction marker, the sample prediction marker representing a real prediction of the target object, i.e., a Ground Truth (GT), wherein the sample prediction marker is also represented as a sample prediction box. In particular, a neural network may be trained with the sample prediction marker based on the relationship between the centroid position (the centroid position of one or more second points to which a third voxel (virtual voxel) corresponds) and the sample prediction marker.

Referring to FIG. 5, when assigning the sample prediction marker to the virtual voxel $V_x$ with the geometric center $G_1$ of the virtual voxel size as a criterion, the sample prediction marker $G_d$ may be ignored because the center $G_1$ does not fall into the sample prediction marker $G_d$. That is, the sample prediction marker $G_d$ is not assigned as a positive sample to a plurality of second points in the virtual voxel $V_x$. Even, the sample prediction marker $G_d$ is taken as a negative sample representing not belonging to a plurality of second points of the virtual voxel $V_x$. When assigning the sample prediction marker to the virtual voxel $V_x$, taking the center $G_2$ of a plurality of points in the virtual voxel as a criterion, it is also possible that the sample prediction marker $G_d$ is ignored because the center $G_2$ does not fall into the sample prediction marker $G_d$. That is, the sample prediction marker $G_d$ is not assigned as a positive sample to a plurality of second points in the virtual voxel $V_x$. Even the sample prediction marker $G_d$ is taken as a negative sample representing not belonging to a plurality of second points of the virtual voxel $V_x$. When assigning the sample prediction marker to the virtual voxel $V_x$, taking the weighted centroid $G_3$ of one or more points corresponding to the virtual voxel as a standard, the weighted centroid $G_3$ can fall within the sample prediction marker $G_d$ with a larger probability, to avoid the sample prediction marker $G_d$ which should be a positive sample being ignored, and further to avoid the sample prediction marker $G_d$ being a negative sample.

Therefore, when training a prediction model of a neural network, it is desirable to provide a method for assigning markers to virtual voxels such that the weighted centroid of one or more points corresponding to a virtual voxel more easily falls within the sample prediction marker $G_d$. The method proposed by the present disclosure includes using a weighted centroid of one or more points corresponding to a third voxel (virtual voxel) as a reference standard point for assigning a training sample to the virtual voxel. Specifically, the foreground point of the target object is more reflective of the true position of the target object. Thus, when the weighted centroid of a virtual voxel is closer to the foreground, there is a greater probability that it can fall within the sample prediction marker so that the sample prediction marker can be smoothly assigned to the virtual voxel.

In some embodiments, calculating a centroid position representing one or more second points corresponding to the third voxels further includes: performing a weighted averaging on positions of one or more foreground points with a first weight and positions of one or more non-foreground points with a second weight to obtain a centroid position representing one or more second points corresponding to the third voxels, wherein the first weight is greater than the second weight. In some embodiments, the first weight may be set to 1 and the second weight may be set to less than 1.

In some embodiments, for each of the one or more third voxels, the centroid position of the one or more second points corresponding to the third voxels are calculated by Formulas (2) and (3) below. In particular, the step of calculating the centroid position of one or more second points corresponding to the third voxels may include: determining a third voxel needing to be used, wherein the one or more second points corresponding to the third voxels include one or more foreground points and one or more non-foreground points.

$$I(x) = \begin{cases} 1 & \text{if } x \in \mathbb{F} \\ \alpha & \text{if } x \notin \mathbb{F} \end{cases}. \quad \text{(Formula 2)}$$

Where F is a foreground point, x is a coordinate of one or more second points corresponding to a third voxel, and I(x) is a weight, wherein $0<\alpha<1$.

Then, a weighted average coordinate of the third voxel can be calculated, i.e., a weighted averaging is performed on the positions of one or more foreground points with a first weight and the positions of one or more non-foreground points with a second weight to obtain a centroid position representing one or more second points corresponding to the third voxel, which is calculated by Formula (3).

$$\bar{x} = \frac{\sum_{i=0}^{N-1} I(x_i)x_i}{\sum_{i=0}^{N-1} I(x_i)}, \quad \text{(Formula 3)}$$

where $\bar{x}$ is a coordinate after weighted averaging, and $x_i$ is a coordinate of a second point.

Specifically, the neural network is trained with the sample prediction marker in response to the centroid position falling in the sample prediction box. When a centroid position (referring to a weighted centroid point of one or more second points corresponding to a virtual voxel) falls within a sample prediction box (referring to a real prediction box for a target object), it is identified as a positive sample, and the sample prediction box is allocated to the virtual voxel; if the weighted centroid falls outside the sample prediction box, it is identified as a negative sample. Next, the neural network can be trained and updated using the information of the positive and negative samples obtained above.

Further, the updating of the neural network further includes: comparing the target prediction marker with the sample target prediction marker to obtain a comparison result. Based on the comparison result, the neural network updates its own prediction model to output a new target prediction marker. The updated prediction model may make the prediction of the target object represented by the new target prediction marker closer to the real prediction of the target object. That is, if the centroid position falls within a sample prediction box, then the sample prediction marker may be assigned to the virtual voxel as a positive sample of the virtual voxel; if the centroid position falls outside the sample prediction box, then the sample prediction marker is a negative sample of the virtual voxel. After the sample prediction marker is determined to be a positive sample or a negative sample of the virtual voxel, the comparison results generated from the sample prediction marker may be used for neural network updating.

Specifically, the process of this update is to adjust the neural network to output a real prediction closer to the target object. That is, the neural network improves its own prediction model according to the comparison result to improve the prediction accuracy of the target object. The updated prediction model will be used to generate new target prediction markers. This new target prediction marker will be closer to the real prediction of the target object. By repeating this updating process, neural networks will gradually improve their ability to predict the target object. In short, the neural network will compare the actual target with its own target prediction in the update process, and then improve the prediction model according to the comparison results to output a prediction closer to the actual target. This process is repeated to improve the prediction accuracy of the neural network.

Figure 6:
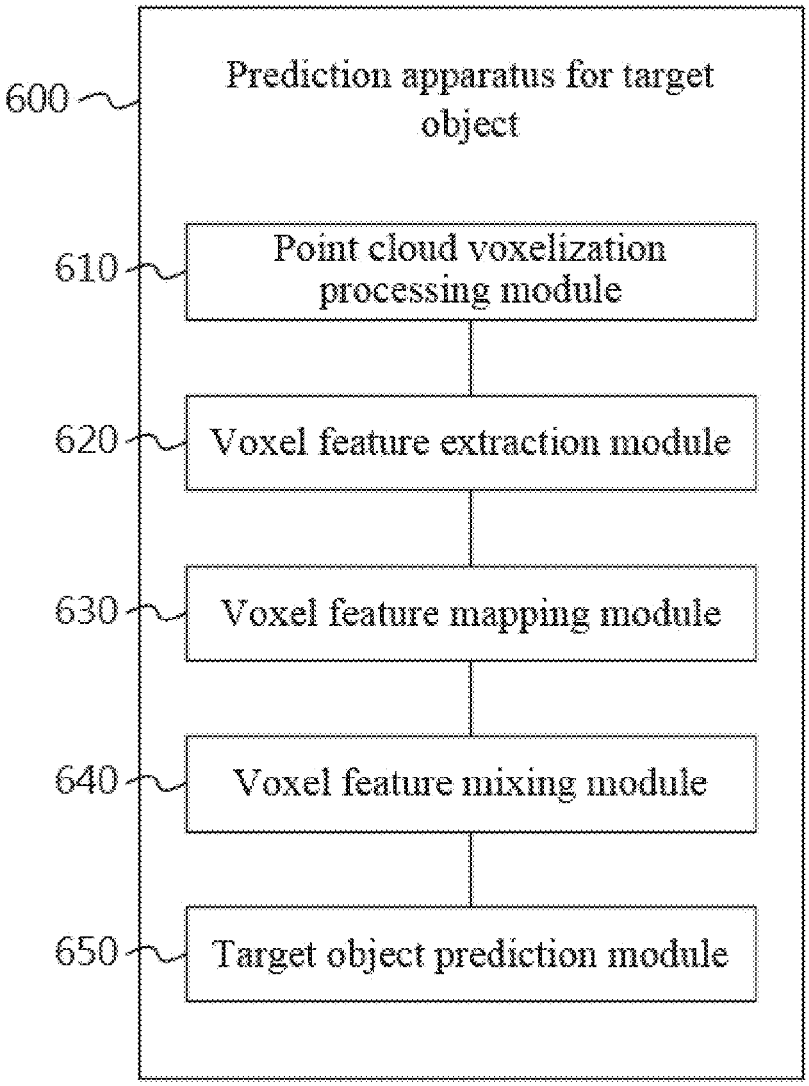
FIG. 6 is a block diagram illustrating a prediction apparatus of a target object according to an embodiment of the present disclosure.

Referring to FIG. 6, one implementation of the present specification also provides a target object prediction apparatus 600. The prediction apparatus 600 of the target object may include a point cloud voxelization processing module 610, a voxel feature extraction module 620, a voxel feature mapping module 630, a voxel feature mixing module 640 and a target object prediction module 650.

A point cloud voxelization processing module 610 is configured for performing voxelization on the point cloud to obtain multiple voxels; wherein the plurality of voxels correspond to a plurality of points in the point cloud.

The voxel feature extraction module 620 is configured for extracting voxel features of multiple voxels to obtain multiple voxel features.

The voxel feature mapping module 630 is configured for mapping the multi-voxel feature to a plurality of points contained in the multi-voxel respectively, obtaining a plurality of point data features of the plurality of points.

The voxel feature mixing module 640 is configured to mix the plurality of voxel features to obtain a plurality of mixed voxel features.

The target object prediction module 650 is configured to predict the target object from a plurality of mixed voxel features.

Regarding the specific definition of the prediction apparatus of the target object, reference can be made to the above definition of the prediction method for the target object, which will not be described in detail herein. The various modules in the above-described prediction apparatus of the target object may be implemented in whole or in part by software, hardware, or a combination thereof. The above-mentioned modules may be embedded in the form of hardware or stored separately from the processor in the computer device, or may be stored in the form of software in the memory of the computer device, so that the processor calls to perform the operations corresponding to the above-mentioned modules.

Figure 7:
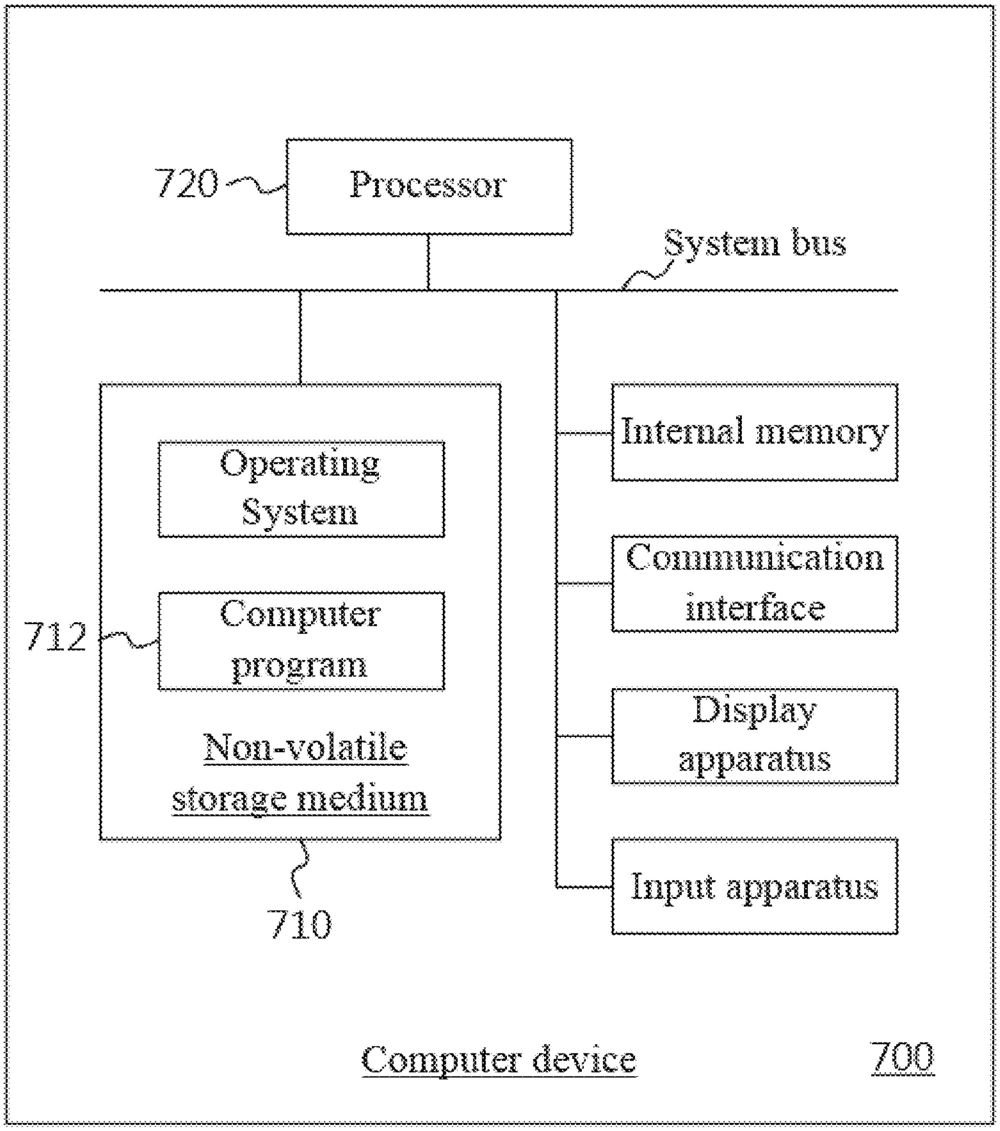
FIG. 7 is a schematic diagram illustrating a computing device according to an embodiment of the present disclosure.

Referring to FIG. 7, implementations of the present disclosure also provide a computer device 700 including a memory 710 and a processor 720, the memory 710 storing a computer program 712, wherein the computer program 712, when executed by the processor 720, implements the prediction method of a target object in the embodiments described above.

The disclosed and other embodiments, modules, and functional operations described in this document may be implemented in digital electronic circuitry, or in computer software, firmware, or hardware (including the structures disclosed in this document and their structural equivalents), or in combinations of one or more of them. The disclosed and other embodiments may be implemented as one or more computer program products, that is, one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including, for example, a programmable processor, a computer, or multiple processors or computers. In addition to hardware, the apparatus can include code that creates an execution environment for the computer program in question, such as code that constitutes processor firmware, a protocol stack, a database management system, an operating system, or a combination of one or more of them. A propagated signal is an artificially generated electrical signal, such as an electrical, optical or electromagnetic signal generated by a machine, that is generated to encode information to be transmitted to a suitable receiver apparatus.

A computer program (also referred to as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), or in a single file dedicated to the program in question, or in multiple collaboration files (e.g., files that store one or more modules, subroutines, or portions of code). A computer program can be deployed to be executed on one computer or on multiple computers that are located at one site or distributed across multiple sites and interconnected by a communication network.

The processes and logic flows described in this document may be executed by one or more programmable processors executing one or more computer programs to perform functions by operating on input data and generating output. The processes and logic flows may also be performed by, and apparatus may be implemented as, special purpose logic circuitry, e.g., a Field Programmable Gate Array (FPGA) or an Application Specific Integrated Circuit (ASIC).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Typically, a computer will also include, or be operatively coupled to receive data from or transfer data to, or both, one or more mass storage devices (e.g., magnetic, magneto-optical disks, or optical disks) for storing data. However, a computer need not have such a device. Computer-readable media suitable for storing computer program instructions and data include all forms of non-volatile memory, media and memory devices, including by way of example semiconductor memory devices, such as EPROM, EEPROM and flash memory devices; a magnetic disk, such as an internal hard disk or a removable disk; magneto-optical disks; and CD-ROM discs and DVD-ROM discs. The processor and memory may be supplemented by, or incorporated in, special purpose logic circuitry.

Some embodiments described herein are described in the general context of a method or process, which in one embodiment may be implemented by a computer program product embodied in a computer-readable medium, which may include computer-executable instructions (such as program code), which may be executed, for example, by computers in networked environments. Computer readable media can include removable and non-removable storage devices including, but not limited to, read only memory (ROM), random access memory (RAM), compact disks (CDs), digital versatile disks (DVD), and the like. Thus, a computer-readable medium can include a non-transitory storage medium. Generally, program modules may include routines, programs, objects, components, data structures, etc. that perform particular tasks or implement particular abstract data types. Computer or processor executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as a device or module using hardware circuitry, software, or a combination thereof. For example, a hardware circuit implementation may include discrete analog and/or digital components, which may be integrated as part of a printed circuit board, for example. Alternatively or additionally, the disclosed components or modules may be implemented as Application-specific Integrated Circuit (ASIC) and/or Field Programmable Gate Array (FPGA) devices. Additionally or alternatively, some implementations may include a Digital Signal Processor (DSP) that is a dedicated microprocessor with an architecture optimized for the operational needs of digital signal processing associated with the disclosed functionality of the present application. Similarly, the various components or sub-assemblies within each module may be implemented in software, hardware, or firmware. Any connection method and medium known in the art may be used to provide connections between modules and/or components within modules, including, but not limited to, communication over the Internet, a wired network, or a wireless network using an appropriate protocol.

Although many details are included herein, these should not be construed as limiting the scope of the claimed invention, but rather as describing features specific to particular embodiments. Certain features that are described herein in the context of separate embodiments may also be combined in a single embodiment. Conversely, various features that are described in the context of a single embodiment can also be implemented in multiple embodiments separately or in any suitable subcombination. Furthermore, while features may be described above as acting in certain combinations and even initially claimed, one or more features from a claimed combination may in some cases be excised from the combination, and the claimed combination may be directed to a subcombination or variation of a subcombination. Similarly, while operations are depicted in the drawings in a particular order, this should not be understood as requiring that such operations be performed in the particular order shown or in a sequential order, or that all illustrated operations be performed, to achieve desired results.

Only a few embodiments and examples are described, and other implementations, enhancements, and variations can be made based on what is described and shown in this disclosure.

What is claimed is:

1. A method for predicting a target object, comprising:

performing a first voxelization on a plurality of first points included in a point cloud to obtain a plurality of first voxels;

predicting, based on the plurality of first voxels, a plurality of second points, wherein each of the plurality of second points represents a prediction of a center of the target object based on the plurality of first points;

performing a second voxelization on the plurality of first points and the plurality of second points to obtain one or more second voxels and one or more third voxels; and predicting, based on the one or more third voxels, the target object, wherein the one or more second voxels correspond to the plurality of first points and the one or more third voxels correspond to the plurality of second points.

2. The method according to claim 1, wherein predicting the plurality of second points comprises:

extracting, by a sparse voxel encoder, a plurality of first voxel features of the plurality of first voxels;

obtaining, based on the plurality of first voxel features, a plurality of point data features of the plurality of first points; and predicting, based on the plurality of point data features, the plurality of second points.

3. The method according to claim 2, wherein obtaining, based on the plurality of first voxel features, the plurality of point data features for the plurality of first points comprises:

for each of the plurality of first voxels:

mapping a first voxel feature of the first voxel to one or more first points comprised by the first voxel to obtain one or more initial point data features;

calculating one or more geometric features between the one or more first points and the corresponding first voxel; and generating, based on the one or more initial point data features and the one or more geometric features, one or more point data features of the one or more first points of the first voxel.

4. The method according to claim 2, wherein predicting, based on the plurality of point data features, the plurality of second points comprises:

predicting, based on a classifier and the plurality of point data features, a plurality of offsets between the plurality of first points and a center of the target object respectively; and obtaining, based on the plurality of first points and the plurality of offsets, the plurality of second points.

5. The method according to claim 1, wherein the one or more third voxels are a plurality of third voxels, predicting, based on the one or more third voxels, the target object comprises:

extracting a plurality of third voxel features of the plurality of third voxels;

mixing the plurality of third voxel features to obtain a plurality of first mixed voxel features, wherein each of the plurality of third voxels corresponds to one of the plurality of first mixed voxel features; and predicting, based on the plurality of first mixed voxel features, the target object.

6. The method according to claim 1, wherein predicting, based on the one or more third voxels, the target object comprises:

predicting, based on the one or more second voxels and the one or more third voxels, the target object.

7. The method according to claim 6, wherein predicting, based on the one or more second voxels and the one or more third voxels, the target object comprises:

extracting one or more second voxel features of the one or more second voxels;

extracting one or more third voxel features of the one or more third voxels;

mixing the one or more second voxel features and the one or more third voxel features to obtain a plurality of second mixed voxel features using a mixing module, preferably a mixing module comprising a convolution network model, wherein each of the one or more second voxels corresponds to one of the plurality of second mixed voxel features and each of the one or more third voxels corresponds to one of the plurality of second mixed voxel features; and predicting, based on the plurality of second mixed voxel features, the target object.

8. The method according to claim 7, wherein predicting, based on the plurality of second mixture voxel features, the target object comprises:

predicting, by a prediction module, the target object based on the plurality of second mixture voxel features corresponding to the one or more third voxels to generate target prediction markers corresponding to the third voxels.

9. The method according to claim 1, wherein a size of a voxel obtained by the second voxelization is larger than a size of a voxel obtained by the first voxelization; and each of the plurality of first voxels comprises a quantity of the first points greater than or equal to a first predetermined value and each of the one or more third voxels comprises a quantity of the second points greater than or equal to a second predetermined value.

10. The method according to claim 1, wherein predicting, based on the one or more third voxels, the target object comprises:

inputting the one or more third voxels into a neural network to output a target prediction marker through a prediction model of the neural network, the target prediction marker representing a prediction of the target object; and the prediction method for the target object further comprises:

obtaining a sample target prediction marker which represents a real prediction of the target object; wherein for each of the one or more third voxels:

calculating a centroid position representing one or more second points corresponding to the third voxel; and training, according to the centroid position and the relationship of the sample target prediction marker, the neural network with the sample target prediction marker.

11. The method according to claim 10, wherein the one or more second points corresponding to the third voxels comprise one or more foreground points and one or more non-foreground points; and calculating the centroid position representing the one or more second points corresponding to the third voxels comprises:

performing weighted averaging on the positions of the one or more foreground points with a first weight and the positions of the one or more non-foreground points with a second weight, to obtain a centroid position representing one or more second points corresponding to the third voxel, wherein the first weight is greater than the second weight.

12. The method according to claim 10, wherein the sample target prediction marker is a sample prediction box; and training, according to the centroid position and the relationship of the sample target prediction marker, the neural network with the sample target prediction marker comprises:

training, in response to the centroid position falling in the sample prediction box, the neural network with the sample target prediction marker.

13. The method according to claim 12, wherein training, in response to that the centroid position falls within the sample prediction box, the neural network with the sample target prediction marker comprises:

comparing the target prediction marker with the sample target prediction marker to obtain a comparison result; and updating, by the neural network, the prediction model based on the comparison result to output a new target prediction marker, wherein the updated prediction model is used to make prediction of the target object represented by the new target prediction marker closer to the real prediction of the target object.

14. An apparatus for predicting a target object, comprising:

a memory storing a computer program; and a processor coupled to the memory, wherein the processor, when executing the computer program, causes the processor to implement a method comprising:

performing a first voxelization on a plurality of first points included in a point cloud to obtain a plurality of first voxels;

predicting, based on the plurality of first voxels, a plurality of second points, wherein each of the plurality of second points represents a prediction of a center of the target object by a first point;

performing a second voxelization on the plurality of first points and the plurality of second points to obtain one or more second voxels and one or more third voxels; and predicting, based on the one or more third voxels, the target object, wherein the one or more second voxels correspond to the plurality of first points and the one or more third voxels correspond to the plurality of second points.

15. The apparatus according to claim 14, wherein predicting the plurality of second points comprises:

extracting, by a sparse voxel encoder, a plurality of first voxel features of the plurality of first voxels;

obtaining, based on the plurality of first voxel features, a plurality of point data features of the plurality of first points; and predicting, based on the plurality of point data features, the plurality of second points.

16. The apparatus according to claim 15, wherein obtaining, based on the plurality of first voxel features, the plurality of point data features for the plurality of first points comprises:

for each of the plurality of first voxels:

mapping a first voxel feature of the first voxel to one or more first points comprised by the first voxel to obtain one or more initial point data features;

calculating one or more geometric features between the one or more first points and the corresponding first voxels; and generating, based on the one or more initial point data features and the one or more geometric features, one or more point data features of the one or more first points of the first voxel; and predicting, based on the plurality of point data features, the plurality of second points comprises:

predicting, based on a classifier and the plurality of point data features, a plurality of offsets between the plurality of first points and a center of the target object respectively; and obtaining, based on the plurality of first points and the plurality of offsets, the plurality of second points.

17. The apparatus according to claim 14, wherein predicting, based on the one or more third voxels, the target object comprises:

extracting one or more second voxel features of the one or more second voxels;

extracting one or more third voxel features of the one or more third voxels;

mixing the one or more second voxel features and the one or more third voxel features to obtain a plurality of second mixed voxel features using a mixing module, preferably a mixing module comprising a convolution network model, wherein each of the one or more second voxels corresponds to one of the plurality of second mixed voxel features and each of the one or more third voxels corresponds to one of the plurality of second mixed voxel features; and predicting, by a prediction module, the target object based on the plurality of second mixture voxel features corresponding to the one or more third voxels to generate target prediction markers corresponding to the third voxels.

18. A non-transitory computer-readable storage medium, wherein the computer-readable storage medium stores a computer program which when executed by a processor implements a method for predicting a target object, the method comprising:

performing a first voxelization on a plurality of first points included in a point cloud to obtain a plurality of first voxels;

predicting, based on the plurality of first voxels, a plurality of second points, wherein each of the plurality of second points represents a prediction of a center of the target object by a first point;

performing a second voxelization on the plurality of first points and the plurality of second points to obtain one or more second voxels and one or more third voxels; and predicting, based on the one or more third voxels, the target object, wherein the one or more second voxels correspond to the plurality of first points and the one or more third voxels correspond to the plurality of second points.

19. The non-transitory computer-readable storage medium according to claim 18, wherein predicting, based on the one or more third voxels, the target object comprises:

inputting the one or more third voxels into a neural network to output a target prediction marker through a prediction model of the neural network, the target prediction marker representing a prediction of the target object; and the prediction method for the target object further comprises:

obtaining a sample target prediction marker which represents a real prediction of the target object; wherein for each of the one or more third voxels:

calculating a centroid position representing one or more second points corresponding to the third voxel; and training, according to the centroid position and the relationship of the sample target prediction marker, the neural network with the sample target prediction marker.

20. The non-transitory computer-readable storage medium according to claim 19, wherein the one or more second points corresponding to the third voxels comprise one or more foreground points and one or more non-foreground points, and the sample target prediction marker is a sample prediction box;

calculating the centroid position representing the one or more second points corresponding to the third voxels comprises:

performing weighted averaging on the positions of the one or more foreground points with a first weight and the positions of the one or more non-foreground points with a second weight, to obtain a centroid position representing one or more second points corresponding to the third voxel, wherein the first weight is greater than the second weight; and training, according to the centroid position and the relationship of the sample target prediction marker, the neural network with the sample target prediction marker comprises:

in response to the centroid position falling in the sample prediction box, comparing the target prediction marker with the sample target prediction marker to obtain a comparison result; and updating, by the neural network, the prediction model based on the comparison result to output a new target prediction marker, wherein the updated prediction model is used to make prediction of the target object represented by the new target prediction marker closer to the real prediction of the target object.

* * * * *